(12) United States Patent
Yoshida (10) Patent No.: US 12,500,491 B2
(45) Date of Patent: Dec. 16, 2025

(54) METHOD FOR MANUFACTURING STATOR CORE

(71) Applicant: MITSUBA Corporation, Gunma (JP)

(72) Inventor: Yasushi Yoshida, Gunma (JP)

(73) Assignee: MITSUBA Corporation, Gunma (JP)

( * ) Notice: Subject to any disclaimer, the term of this patent is extended or adjusted under 35 U.S.C. 154(b) by 521 days.

(21) Appl. No.: 17/927,357

(22) PCT Filed: May 27, 2021

(86) PCT No.: PCT/JP2021/020169
§ 371 (c)(1),
(2) Date: Nov. 22, 2022

(87) PCT Pub. No.: WO2022/004206
PCT Pub. Date: Jan. 6, 2022

(65) Prior Publication Data
US 2023/0208260 A1    Jun. 29, 2023

(30) Foreign Application Priority Data

Jun. 29, 2020   (JP) ................................ 2020-111269

(51) Int. Cl.
*H02K 15/026*    (2025.01)
(52) U.S. Cl.
CPC .................. *H02K 15/026* (2013.01)
(58) Field of Classification Search
CPC ....... H02K 15/026; H02K 1/148; H02K 15/02
See application file for complete search history.

(56) References Cited

U.S. PATENT DOCUMENTS

| 2007/0290567 A1* | 12/2007 | Adaniya | ................ | H02K 1/148 |
| | | | | 310/216.004 |
| 2008/0191578 A1* | 8/2008 | Evans | ................... | H02K 1/148 |
| | | | | 310/216.012 |

(Continued)

FOREIGN PATENT DOCUMENTS

| JP | 2013115965 | 6/2013 |
| JP | 2014093803 | 5/2014 |

(Continued)

OTHER PUBLICATIONS

"International Search Report (Form PCT/ISA/210) of PCT/JP2021/020169," mailed on Jul. 20, 2021, with English translation thereof, pp. 1-4.

(Continued)

*Primary Examiner* — Jeffrey T Carley
*Assistant Examiner* — Jose K Abraham
(74) *Attorney, Agent, or Firm* — JCIPRNET (57) ABSTRACT

Disclosed is a method for manufacturing a stator core including multiple teeth around which a coil is to be wound, a teeth-connecting part that connects adjacent ones of the teeth, and a first annular part having, on an inner circumferential part thereof, multiple fitting parts to be respectively fitted with the teeth. The manufacturing method includes: (a) a step for punching out, from a sheet material, an inner core (second annular part) in which the teeth and the teeth-connecting part are formed integrally; (b) a step for subjecting the sheet material, prior to the punching of the inner core, to a non-magnetization treatment in a section of the sheet material corresponding to the teeth-connecting part; and (c) a step for fitting the first annular part and the inner core by the fitting parts.

2 Claims, 8 Drawing Sheets

(56) References Cited

U.S. PATENT DOCUMENTS

| | | | |
|---|---|---|---|
| 2013/0061641 A1* | 3/2013 | Yoon ................... | H02K 1/2773 |
| | | | 310/43 |
| 2013/0134827 A1* | 5/2013 | Nagahama ............ | H02K 1/185 |
| | | | 310/216.113 |
| 2019/0103789 A1* | 4/2019 | Yamamoto ............ | G04C 3/146 |

FOREIGN PATENT DOCUMENTS

| | | | |
|---|---|---|---|
| JP | 2015053823 | | 3/2015 |
| JP | 2017077108 A | * | 4/2017 |
| JP | 2019068724 | | 4/2019 |

OTHER PUBLICATIONS

"Written Opinion of the International Searching Authority (Form PCT/ISA/237) of PCT/JP2021/020169," mailed on Jul. 20, 2021, with English translation thereof, pp. 1-8.

* cited by examiner

METHOD FOR MANUFACTURING STATOR CORE

CROSS-REFERENCE TO RELATED APPLICATION

This application is a 371 application of the International PCT application serial no. PCT/JP2021/020169, filed on May 27, 2021, which claims the priority benefits of Japan Patent Application No. 2020-111269, filed on Jun. 29, 2020. The entirety of each of the above-mentioned patent applications is hereby incorporated by reference herein and made a part of this specification.

TECHNICAL FIELD

The disclosure relates to a method for manufacturing a stator core used in a rotary electric machine.

RELATED ART

As a stator core used in a rotary electric machine such as a brushless motor, a stator core having an annular teeth member having multiple teeth and an annular yoke member disposed outside the annular teeth member is known. As an example of a method for manufacturing such a stator core, a manufacturing method is known in which an annular teeth member and an annular yoke member are separately formed, and after winding a coil around each of the multiple teeth of the annular teeth member, the annular teeth member and the annular yoke member are fitted together. In such a manufacturing method, since the coil is attached to each tooth of the annular teeth member before the annular teeth member and the annular yoke member are fitted together, the coil may be easily attached to each tooth.

An example of a method for manufacturing a stator core as described above is disclosed in Patent Literature 1.

CITATION LIST

Patent Literature

[Patent Literature 1] Japanese Patent Application Laid-Open No. 2013-115965

SUMMARY

Technical Problem

The annular teeth member that configures the stator core as described above has multiple teeth and teeth-connecting parts that connect the multiple teeth, and the magnetic flux between the teeth may leak at the teeth-connecting parts. When magnetic flux leaks between the teeth in the rotary electric machine, there is a risk that the output characteristics of the rotary electric machine will deteriorate.

The above Patent Literature 1 describes that the teeth-connecting parts of the annular teeth member are subjected to a non-magnetization treatment in order to reduce the leakage of magnetic flux between the teeth. Specifically, the above Patent Literature 1 describes that a core sheet material punched out from a sheet material is laminated to form an annular teeth member, and the annular teeth member is subjected to a non-magnetization treatment. In this case, after the annular teeth member is formed, all of the multiple teeth-connecting parts of the annular teeth member are subjected to a non-magnetization treatment; therefore, it takes time to perform the non-magnetization treatment. In addition, even when the core sheet material before lamination is subjected to the non-magnetization treatment, treatment time corresponding to the number of core sheet materials to be laminated is required, and there is concern that the time spent on the non-magnetization treatment will increase.

Moreover, if additional treatment is performed on a core sheet or a laminate of core sheets punched out from a sheet material, the dimensions of the core sheet or the laminate may change.

The disclosure provides a method for manufacturing a stator core in which the processing time is shortened while stabilizing the quality.

Solution to Problem

An embodiment of the disclosure provides a method for manufacturing a stator core in which a coil is to be wound. The stator core includes: multiple teeth around which the coil is to be wound: a teeth-connecting part which connects adjacent ones of the teeth; and a first annular part provided with multiple fitting parts to be respectively fitted with the teeth on an inner circumferential part of the first annular part. The method for manufacturing the stator core includes: (a) a step for punching out, from a sheet material, a second annular part in which the teeth and the teeth-connecting part are formed integrally: (b) a step for subjecting the sheet material, prior to punching out the second annular part, to a non-magnetization treatment in a section of the sheet material corresponding to the teeth-connecting part; and (c) a step for integrating the first annular part and the second annular part by fitting the teeth with the fitting parts.

Effects of Invention

According to the disclosure, the time for processing the stator core may be reduced while the quality of the stator core may be stabilized.

DESCRIPTION OF THE EMBODIMENTS

Hereinafter, embodiments of the disclosure will be described in detail with reference to the drawings.

Figure 1:
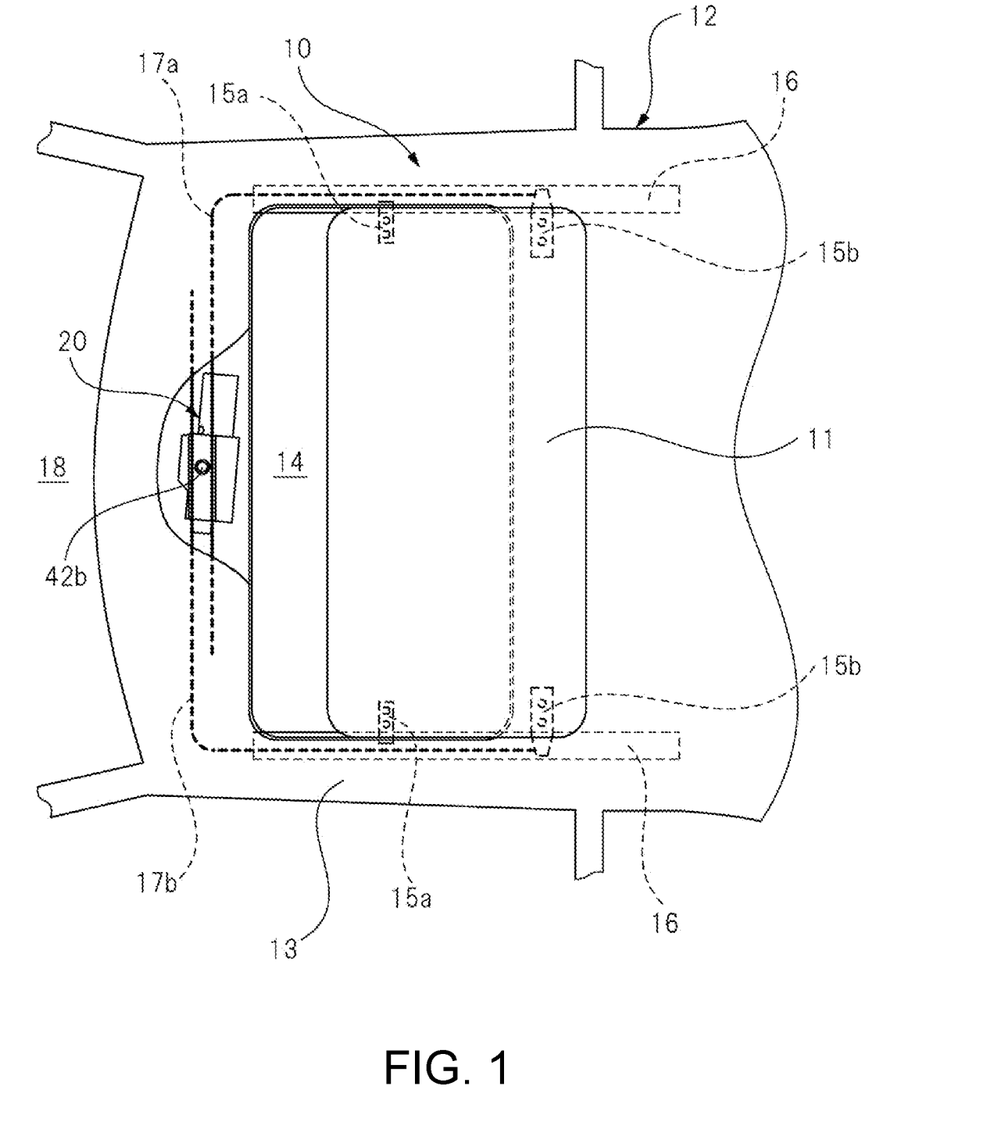
FIG. 1 is a schematic view showing a sunroof device mounted on a roof of a vehicle.

First, a motor device equipped with a brushless motor of this embodiment will be described. As shown in FIG. 1, a sunroof device 10 has a roof panel 11. The roof panel 11 opens and closes an opening 14 formed in a roof 13 of a vehicle 12. A pair of shoes 15a and 15b are fixed to both sides of the roof panel 11 along the vehicle width direction (up-down direction in the figure). Further, guide rails 16 extending in the front-rear direction of the vehicle 12 (left-right direction in the figure) are fixed to both sides of the opening 14 of the roof 13 along the vehicle width direction. The pair of shoes 15a and 15b are guided by the corresponding pair of guide rails 16, respectively, so that the roof panel 11 may move in the front-rear direction of the vehicle 12, that is, may be opened and closed.

One ends of drive cables 17a and 17b with gears are connected to each of the shoes 15b disposed on the rear side (right side in the figure) of the vehicle 12. The other ends of these drive cables 17a and 17b are routed to the front side of the vehicle 12 (left side in the figure) from the opening 14.

A motor device 20 is mounted inside the roof 13 disposed between the opening 14 and a windshield 18 on the front side of the vehicle 12. The other ends of the pair of drive cables 17a and 17b are engaged with an output gear 42b provided on the motor device 20. Here, when the motor device 20 is driven, the pair of shoes 15a and 15b are moved in opposite directions as the output gear 42b rotates. In this way, the roof panel 11 is pushed and pulled by the pair of drive cables 17a and 17b via the pair of shoes 15b, thereby opening and closing automatically.

Next, the motor device 20 of this embodiment will be described. In the following description, the term "axial direction" refers to the rotation axis direction of the shaft of the motor, and the term "circumferential direction" refers to the circumferential direction of the shaft, and the term "radial direction" refers to the radial direction of the shaft.

Figure 2:
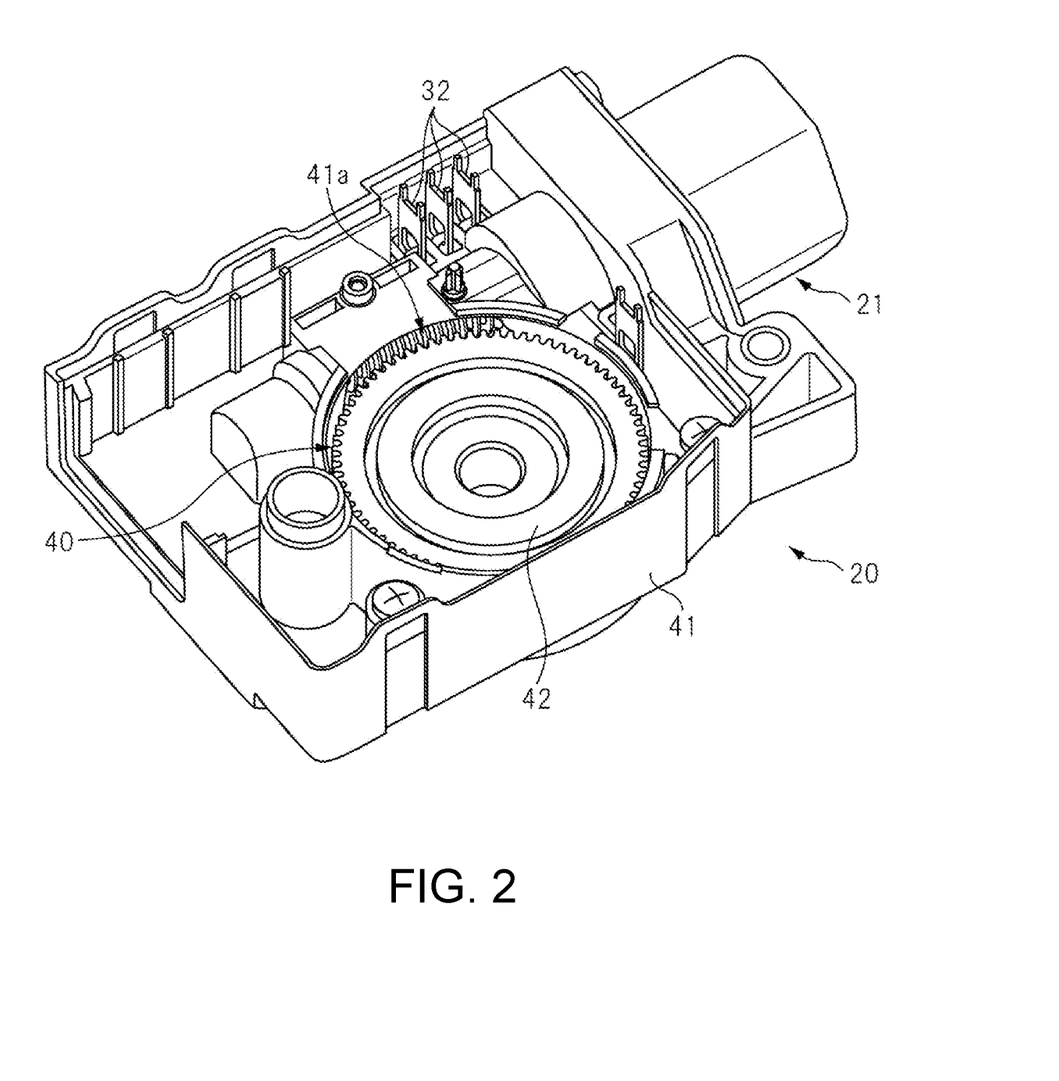
FIG. 2 is a perspective view of a motor device according to an embodiment of the disclosure.
Figure 3:
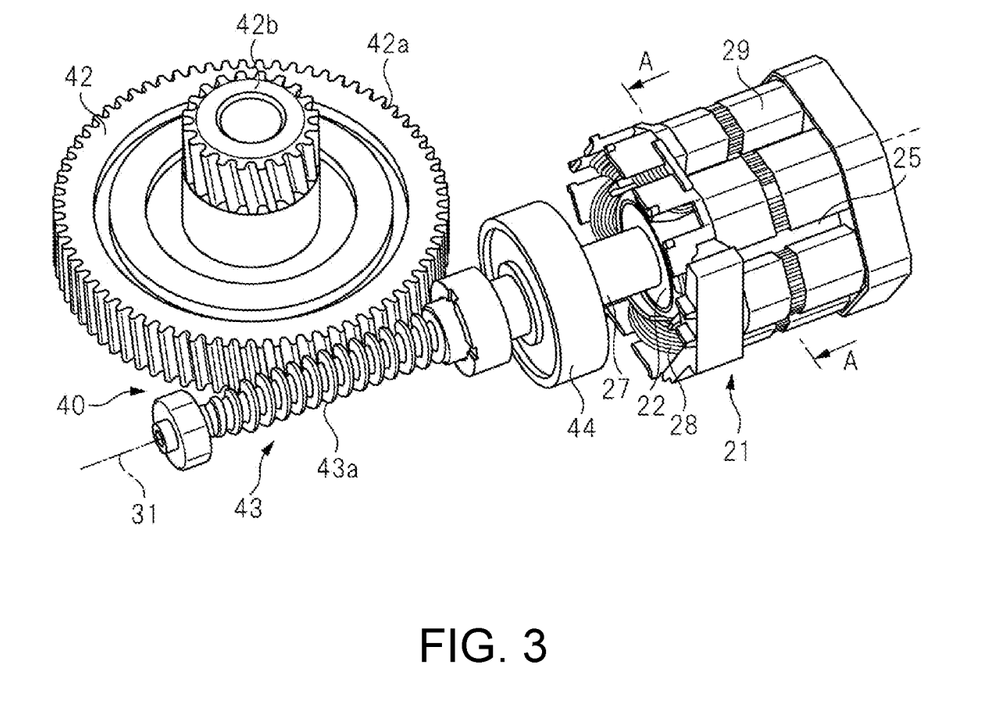
FIG. 3 is a perspective view showing an engagement state between a worm and a worm wheel formed on a shaft of the brushless motor incorporated in the motor device shown in FIG. 2.

As shown in FIG. 2, the motor device 20 includes a brushless motor 21 and a gear part 40. The brushless motor 21 includes a stator 29 having an annular stator core 25 shown in FIG. 4 and a coil (winding) 28 wound around the stator core 25. The stator core 25 includes multiple teeth 30 extending radially inward. The brushless motor 21 also includes a rotor 24 rotatably disposed inside the teeth 30. The rotor 24 includes a rotor core 22 and a ring-shaped magnet 23 provided on the outer circumference of the rotor core 22. Further, the brushless motor 21 includes a shaft 27 that is provided radially inside the stator core 25 and that rotates around a rotation axis 31 shown in FIG. 3. The rotor core 22 is fixed to the shaft 27 and is centered on the rotation axis 31 in the radial direction. The shaft 27 is rotatably supported by ball bearings 44, as shown in FIG. 3.

Figure 4:
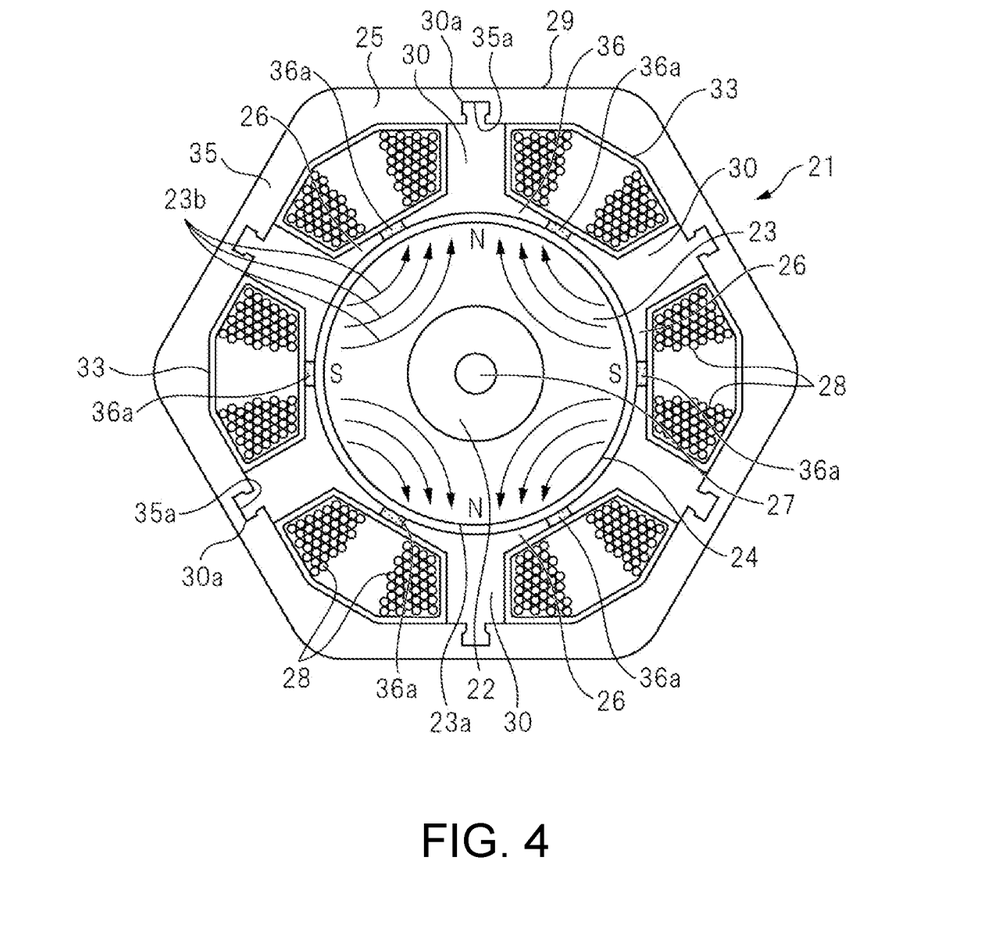
FIG. 4 is a cross-sectional view taken along the line A-A in FIG. 3.

Further, as shown in FIG. 4, the stator core 25 includes multiple teeth 30 protruding radially inwardly of the stator core 25 from the inner circumferential surface of the stator core 25, and a coil 28 is wound around each of the multiple teeth 30 via an insulating film 33.

Next, as shown in FIG. 2, the gear part 40 is provided with a gear case 41. The opening of the gear case 41 is closed by a gear cover (not shown). The gear cover is made of a resin material such as plastic and has a substantially flat plate shape, and may be easily attached to the gear case 41 by a so-called snap-fit engagement structure.

Further, the gear case 41 is provided with a worm wheel accommodating part 41a. The worm wheel accommodating part 41a is recessed in the thickness direction of the gear case 41 and on the side opposite to the gear cover side. A worm wheel 42 forming a reduction mechanism is rotatably accommodated in the worm wheel accommodating part 41a.

The worm wheel 42 is made of a resin material such as plastic and has a substantially disk shape. As shown in FIG. 3, a teeth part 42a is formed on the radially outer side of the worm wheel 42 and engages with a worm 43a provided on a worm shaft 43 formed continuously with the shaft 27. Further, the axial base side of the output gear 42b is fixed to the rotation center of the worm wheel 42. Here, the output gear 42b is made of steel, and its axial intermediate part is rotatably supported by the boss part of the gear case 41 shown in FIG. 2. The axial tip side of the output gear 42b extends outside the gear case 41, whereby the other ends of the pair of drive cables 17a and 17b are engaged with the tip side of the output gear 42b (see FIG. 1).

Here, the operation of the motor device 20 will be described.

In the motor device 20, power supplied from the outside through a terminal 32 shown in FIG. 2 to a controller board (not shown) is selectively supplied to each coil 28 of the brushless motor 21 shown in FIG. 4. Then, a predetermined interlinkage magnetic flux is formed in the stator 29 (teeth 30), and a magnetic attraction force or repulsion force is generated between this interlinkage magnetic flux and an effective magnetic flux formed by the magnet 23 provided in the rotor core 22. This causes the rotor core 22 to rotate continuously.

When the rotor core 22 rotates, the worm shaft 43 integrated with the shaft 27 shown in FIG. 3 rotates, and the worm wheel 42 engaged with the worm shaft 43 rotates. Then, the output gear 42b connected to the worm wheel 42 rotates to drive desired electrical components.

Next, the ring-shaped magnet 23 attached to the brushless motor 21 of this embodiment will be described. As shown in FIG. 4, the magnet 23 is magnetized so that magnetic poles such as N poles and S poles are formed on the outer circumferential surface 23a of the magnet 23 facing each of the multiple teeth 30. The magnet 23 magnetized in this way is also called a pole-oriented magnet 23. Specifically, in the ring-shaped magnet 23, as a way for increasing the magnetic flux 23b, polar anisotropic magnetization is applied so that magnetic poles are formed on the outer circumferential surface 23a of the outer circumferential part of the magnet 23. In this way, magnetic poles such as N poles and S poles are formed on the outer circumferential surface 23a facing each of the multiple teeth 30. In the brushless motor 21 magnetized by the above-mentioned polar anisotropic magnetization, magnetic flux leakage to the inside of the ring-shaped magnet 23 does not occur: therefore, it is not required to dispose a magnetic part inside the ring-shaped magnet 23. The magnetization method of the magnet 23 is not limited to polar anisotropic magnetization. For example, a magnetization method may be applied in which the magnetization orientation is radial in the radial direction of the ring-shaped magnet 23.

Next, the detailed structure of the stator core 25 of the brushless motor 21 in this embodiment will be described. As shown in FIG. 4, the stator core 25 includes multiple teeth 30 around which coils 28 are wound, teeth-connecting parts 26 that connect adjacent teeth 30 among the multiple teeth 30, and an annular outer core (first annular part) 35 provided with multiple fitting parts 35a that fit with the multiple teeth 30 on the inner circumferential part. The multiple teeth 30 and the teeth-connecting parts 26 are integrally formed as an annular inner core (second annular part) 36. The inner core 36 is disposed inside the outer core 35 and is fitted with the outer core 35 at the multiple fitting parts 35a. That is, the stator core 25 of this embodiment is configured by the outer core 35 and the inner core 36 which are two divided annular cores, and the outer core 35 and the inner core 36 are fitted together.

Figure 5:
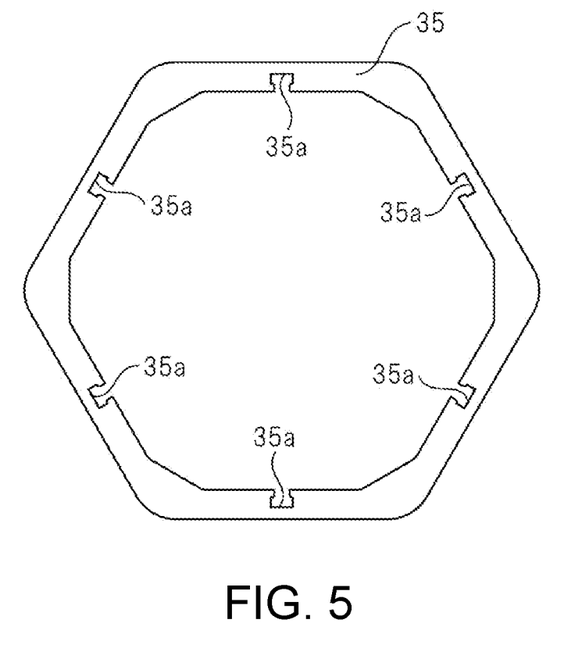
FIG. 5 is a plan view showing the shape of an outer core of the stator core shown in FIG. 4.

As shown in FIG. 5, the outer core 35 is formed in an annular shape and is made of, for example, ferrous metal. Concave fitting parts 35*a* whose number corresponds to the number of teeth 30 to be mounted are formed on the inner circumferential part of the outer core 35 at predetermined equal intervals.

Figure 6:
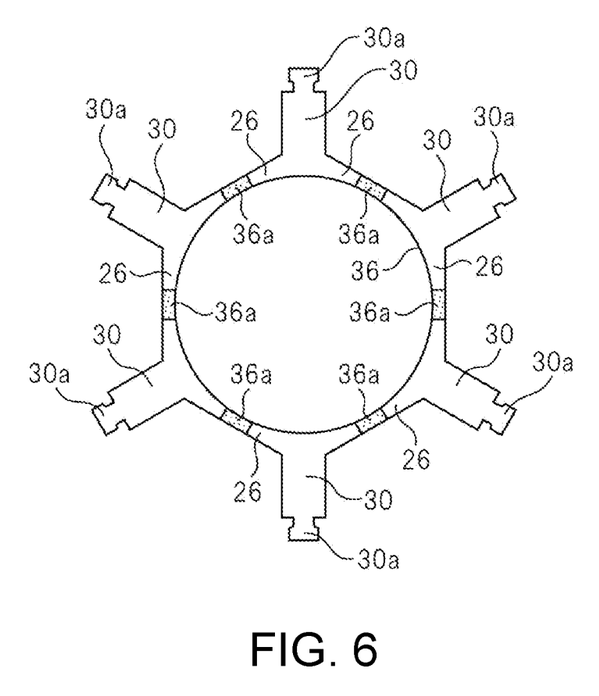
FIG. 6 is a plan view showing the shape of an inner core of the stator core shown in FIG. 4.

As shown in FIG. 6, the inner core 36 is also formed in an annular shape and is made of, for example, ferrous metal. The multiple teeth 30 are provided at predetermined equal intervals on the outer circumferential part of the inner core 36. The teeth-connecting parts 26 are disposed between the adjacent teeth 30, and each tooth 30 and the teeth-connecting part 26 are integrally formed. Furthermore, a protrusion 30*a* that may be fitted with the fitting part 35*a* of the outer core 35 is provided at the outer tip of each tooth 30.

Further, in the stator core 25 of this embodiment, a non-magnetic part 36*a* is provided in each of the multiple teeth-connecting parts 26 in the inner core 36 thereof. The non-magnetic part 36*a* is formed by applying a non-magnetization treatment to the vicinity of the central part in the circumferential direction of each teeth-connecting part 26. By forming the non-magnetic part 36*a* near the central part of the teeth-connecting part 26, leakage of the magnetic flux 23*b* (see FIG. 4) between the teeth 30 in the teeth-connecting part 26 may be prevented. In addition, the formation position of the non-magnetic part 36*a* in the teeth-connecting part 26 is not limited to the vicinity of the circumferential central part of the teeth-connecting part 26.

In this embodiment, the non-magnetization treatment is performed on the sheet material 34 before the core sheet of the stator core 25 is punched out from the sheet material 34 shown in FIG. 7 by punching such as press working (to be described later). The sheet material 34 is made of, for example, ferrous metal. The non-magnetization treatment is, for example, irradiation with a laser 37. Alternatively, the non-magnetization treatment may form a predetermined processing strain in the sheet material 34. In either case of irradiation of the laser 37 or formation of processing strain, the formation of the non-magnetic part 36*a* may prevent leakage of the magnetic flux 23*b* between the teeth 30 in the teeth-connecting part 26, and may prevent deterioration of the magnetic characteristics of the brushless motor 21.

Next, a method for manufacturing the stator core 25 of this embodiment will be described.

Figure 7:
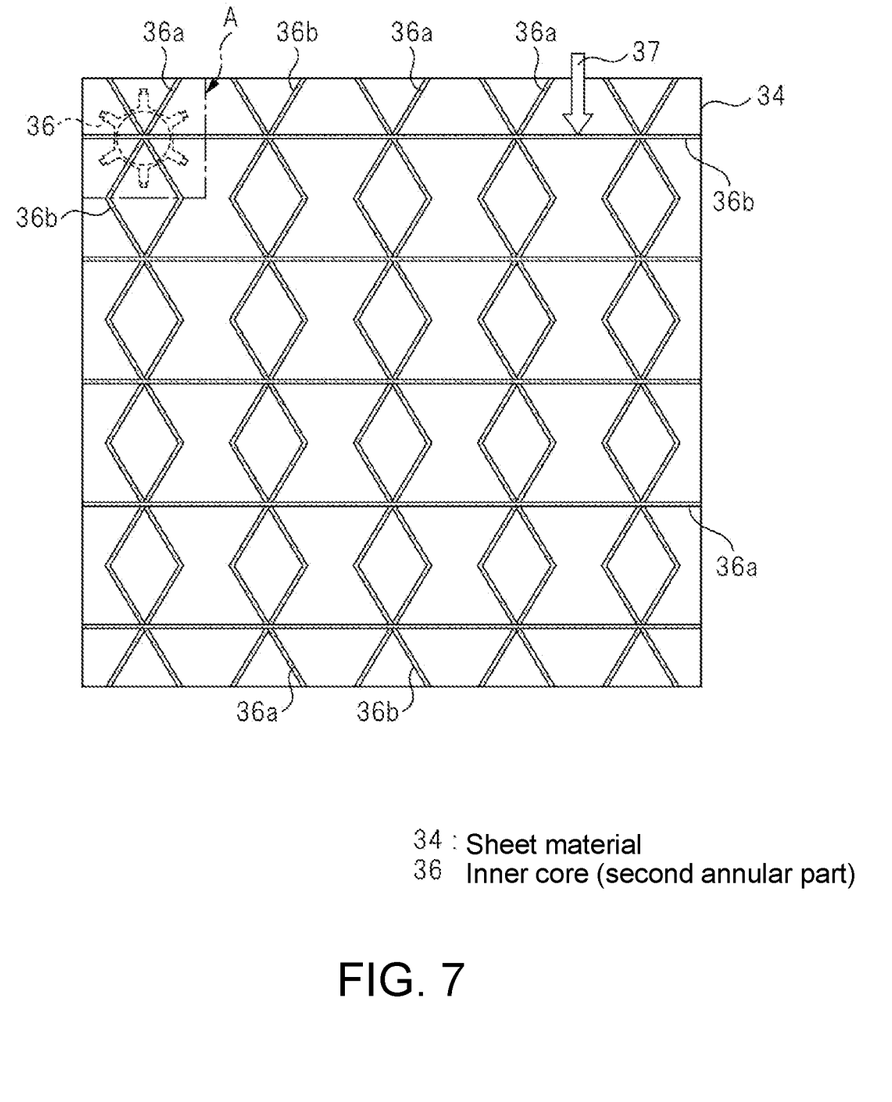
FIG. 7 is a plan view showing a sheet material for punching the inner core shown in FIG. 6.
Figure 8:
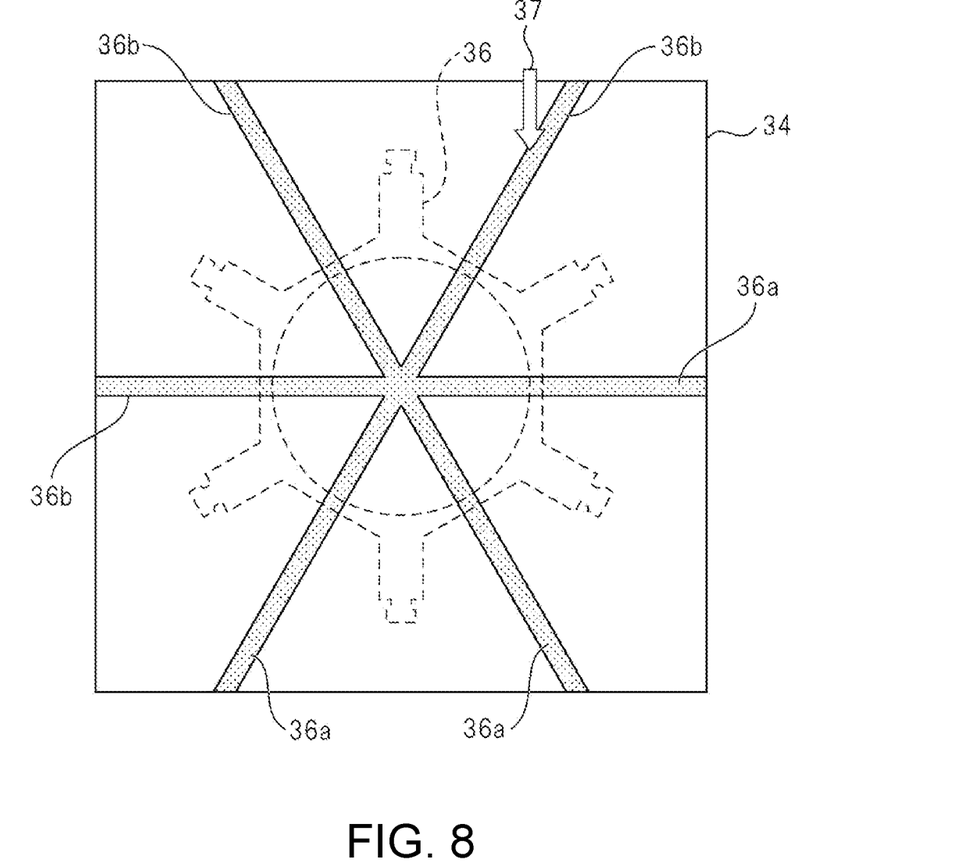
FIG. 8 is an enlarged partial plan view showing the part A in FIG. 7.

First, as shown in FIGS. 7 and 8, the sheet material 34 made of ferrous metal is subjected to non-magnetization treatment at sections corresponding to the teeth-connecting parts 26 of the inner core 36 shown in FIG. 6. For example, as the non-magnetization treatment, the sheet material 34 is irradiated with the laser 37 before the inner core 36 is punched out, so that the sheet material 34 is formed with a predetermined pattern 36*b* configured by the non-magnetic part 36*a*.

In this embodiment, the predetermined pattern 36*b* is a pattern 36*b* in which each of the multiple non-magnetic parts 36*a* is linearly formed, and the multiple linear non-magnetic parts 36*a* are repeatedly formed. As an example, a pattern 36*b* configured by three linear non-magnetic parts 36*a* as shown in FIG. 8 is formed repeatedly in the vertical and horizontal directions of the sheet material 34 as shown in FIG. 7. In this embodiment, a linear pattern 36*b* configured by the non-magnetic parts 36*a* is formed so that the pattern 36*b* configured by three linear non-magnetic parts 36*a* as shown in FIG. 8 corresponds to one inner core 36, and corresponds to the vicinity of the central part of each of the multiple teeth-connecting parts 26.

Figure 9:
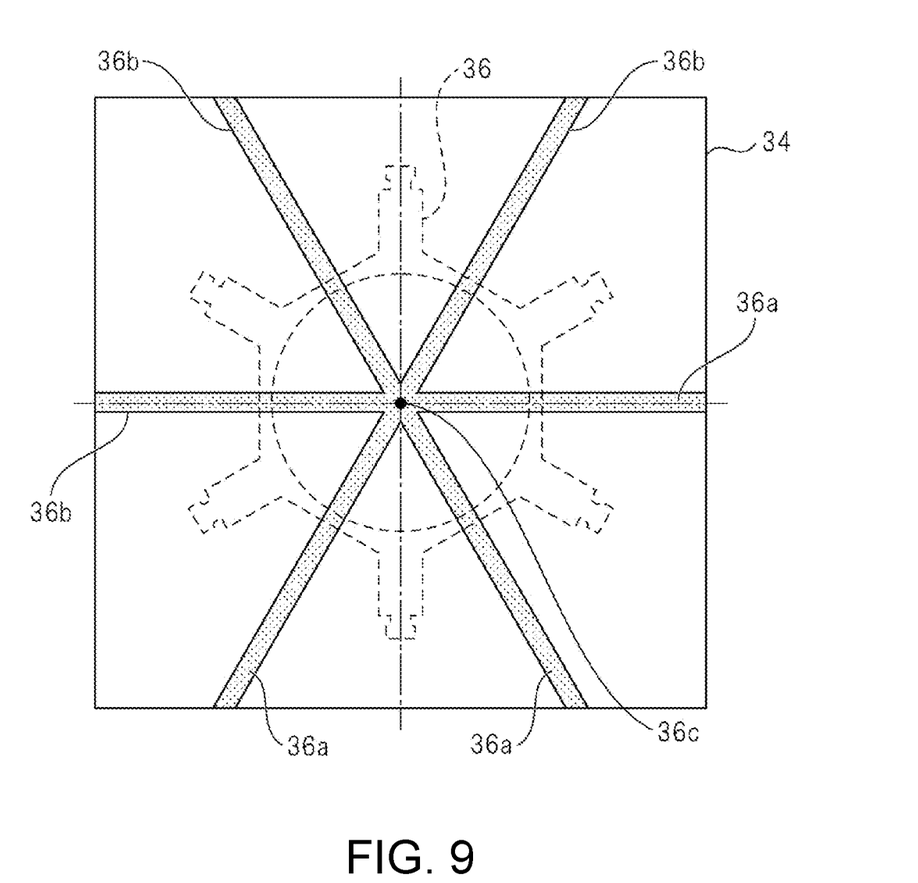
FIG. 9 is a plan view showing a mark for punching the inner core shown in FIG. 6.

Incidentally, as shown in FIG. 9, the three linear non-magnetic parts 36*a* corresponding to one inner core 36 are formed with one intersection part 36*c* where the three linear non-magnetic parts 36*a* intersect. This intersection part 36*c* corresponds to the center of the annular inner core 36.

After irradiating the sheet material 34 with the laser 37 to form the predetermined pattern 36*b* configured by three linear non-magnetic parts 36*a* repeatedly in the vertical and horizontal directions of the sheet material 34, the inner core 36 having the shape of the inner core 36 as shown in FIG. 6 is punched out by press working. At this time, for example, as shown in FIG. 9, the inner core 36 is punched out from the sheet material 34 using the intersection part 36*c* where the three linear non-magnetic parts 36*a* intersect as a mark. That is, press working is performed in a state in which the shape of the inner core 36 is aligned with the pattern 36*b* configured by the three linear non-magnetic parts 36*a* with the intersection part 36*c* as the center point of the annular inner core 36. Then, the inner core 36 having a shape as shown in FIG. 6 is punched out. In this way, core sheets of multiple inner cores 36 having non-magnetic parts 36*a* formed near the central part of each teeth-connecting part 26 may be obtained from the sheet material 34.

By laminating a predetermined number of core sheets of the inner core 36, an annular inner core 36 having a predetermined thickness and having the non-magnetic parts 36*a* formed near the central part of each teeth-connecting part 26 as shown in FIG. 6 is formed.

Further, coils 28 are wound around each of the teeth 30 of the inner core 36 as shown in FIG. 4. At this time, in the inner core 36, since the parts between the adjacent teeth 30 are open outward, the nozzle of the coil winding machine may easily move vertically and horizontally around each tooth 30, and the winding time of the coils 28 may be shortened.

In addition, core sheets of multiple outer cores 35 are obtained by punching the outer cores 35 from another sheet material or the like. Then, by laminating a predetermined number of core sheets of the outer core 35, the outer core 35 having a predetermined thickness and having multiple fitting parts 35*a* formed on the inner circumferential part as shown in FIG. 5 is formed.

Then, an inner core 36 having coils 28 wound around each of the teeth 30 and an outer core 35 having multiple fitting parts 35*a* are fitted together to integrate the inner core 36 and the outer core 35 together. That is, the stator core 25 is formed. At this time, the stator core 25 is formed by fitting the protrusions 30*a* at the tip of each of the teeth 30 of the inner core 36 to the fitting parts 35*a* on the inner circumferential part of the outer core 35.

In the method for manufacturing the stator core 25 of this embodiment, before the core sheet of the inner core 36 is punched out from the sheet material 34 by punching such as press working, the non-magnetization treatment is performed on a section corresponding to the teeth-connecting part 26 of the inner core 36 of the sheet material 34; therefore, the non-magnetic part 36*a* is already formed in the core sheet of the inner core 36 at the time of punching. Therefore, compared with the case where the non-magnetization treatment is performed after the core sheet is punched out, there is no need to individually perform the non-magnetization treatment on each of the multiple teeth-connecting parts 26, and the processing time for the non-magnetization treatment may be reduced, and the processing time required for forming the inner core 36 may be greatly shortened.

Further, since there is no need to perform additional processing on the core sheet of the inner core 36 punched from the sheet material 34 or the laminate of core sheets, there is no concern that the dimensions of the core sheet of the inner core 36 or the laminate may be changed. That is, the dimensional accuracy of the inner core 36 punched out by press working may be maintained as it is.

As a result, the time for processing the stator core 25 may be reduced while the quality of the stator core 25 may be stabilized.

In addition, since the non-magnetic parts 36a are formed as a predetermined pattern 36b on the sheet material 34, it is also possible to use the intersection part 36c of the pattern 36b or the like as a mark during punching. Furthermore, by forming the non-magnetic parts 36a as a predetermined pattern 36b on the sheet material 34, skew and the like may be dealt with. For example, in some cases, the position of the non-magnetic part 36a in the stator core 25 may be changed with respect to the central part of the teeth-connecting part 26 in order to bring out the characteristics of the motor. In the method for manufacturing the stator core 25 of this embodiment, when punching the inner core 36 in the sheet material 34, the position of the non-magnetic part 36a may be shifted from the central part of the teeth-connecting part 26 by only slightly changing the punching position.

In other words, in the method for manufacturing the stator core 25 of this embodiment, the formation position of the non-magnetic part 36a may be set at various positions, and it is possible to correspond to variations in the characteristics of the motor. In the method of forming the non-magnetic part 36a on the stator core after punching, it is very difficult to change the position of the non-magnetic part 36a after punching.

Further, in the stator core 25 of this embodiment, the multiple teeth 30 and the teeth-connecting parts 26 are integrally formed in the inner core 36 thereof. In this way, the rigidity of the inner core 36 may be ensured, and the number of parts of the inner core 36 may be reduced.

Further, by forming the non-magnetic part 36a by irradiating the laser 37, it is possible to form the non-magnetic part 36a easily in a short time with high accuracy.

In the above embodiment, the non-magnetic part 36a is formed by irradiation with the laser 37, but the non-magnetic part 36a may be formed by processing strain or the like.

It goes without saying that the disclosure is not limited to the above embodiments, and various modifications may be made without departing from the spirit of the disclosure. For example, in the above embodiment, the shape of the outer core 35 of the stator core 25 of the brushless motor 21 incorporated in the motor device 20 may be circular.

Further, in the above embodiment, the ring-shaped magnet 23 is used as the magnet 23 incorporated inside the brushless motor 21, but the magnet 23 may be multiple split magnets 23 attached to the outer circumferential part of the rotor core 22.

Further, in the above embodiment, the brushless motor 21 is mounted on the motor device 20, but the brushless motor 21 may be a motor for driving a power window or the like.

What is claimed is:

1. A method for manufacturing a stator core in which a coil is to be wound, wherein the stator core comprises:
   a plurality of teeth around which the coil is to be wound;
   a teeth-connecting part configured to connect adjacent ones of the teeth; and
   a first annular part provided with a plurality of fitting parts to be respectively fitted with the teeth on an inner circumferential part of the first annular part,
   wherein the method for manufacturing the stator core comprises following steps:
   (a) punching out, from a sheet material, a second annular part in which the teeth and the teeth-connecting part are formed integrally;
   (b) subjecting the sheet material, prior to punching out the second annular part, to a non-magnetization treatment in a section of the sheet material corresponding to the teeth-connecting part; and
   (c) a step for integrating the first annular part and the second annular part by fitting the teeth with the fitting parts,
   wherein in the step (b), the non-magnetization treatment is performed so that a non-magnetic part formed by the non-magnetization treatment forms a predetermined pattern on the sheet material,
   wherein the predetermined pattern is a pattern in which a plurality of the non-magnetic parts each in a linear shape are repeatedly formed, and
   in the step (a), the second annular part is punched out from the sheet material using an intersection part as a punching mark, wherein the non-magnetic parts intersecting with each other are thereby form the punching mark.

2. The method for manufacturing the stator core according to claim 1, wherein in the step (b), the sheet material is irradiated with a laser as the non-magnetization treatment.

* * * * *